B. MORSE.
Horse Hay-Rakes.
No. 141,884. Patented August 19, 1873.
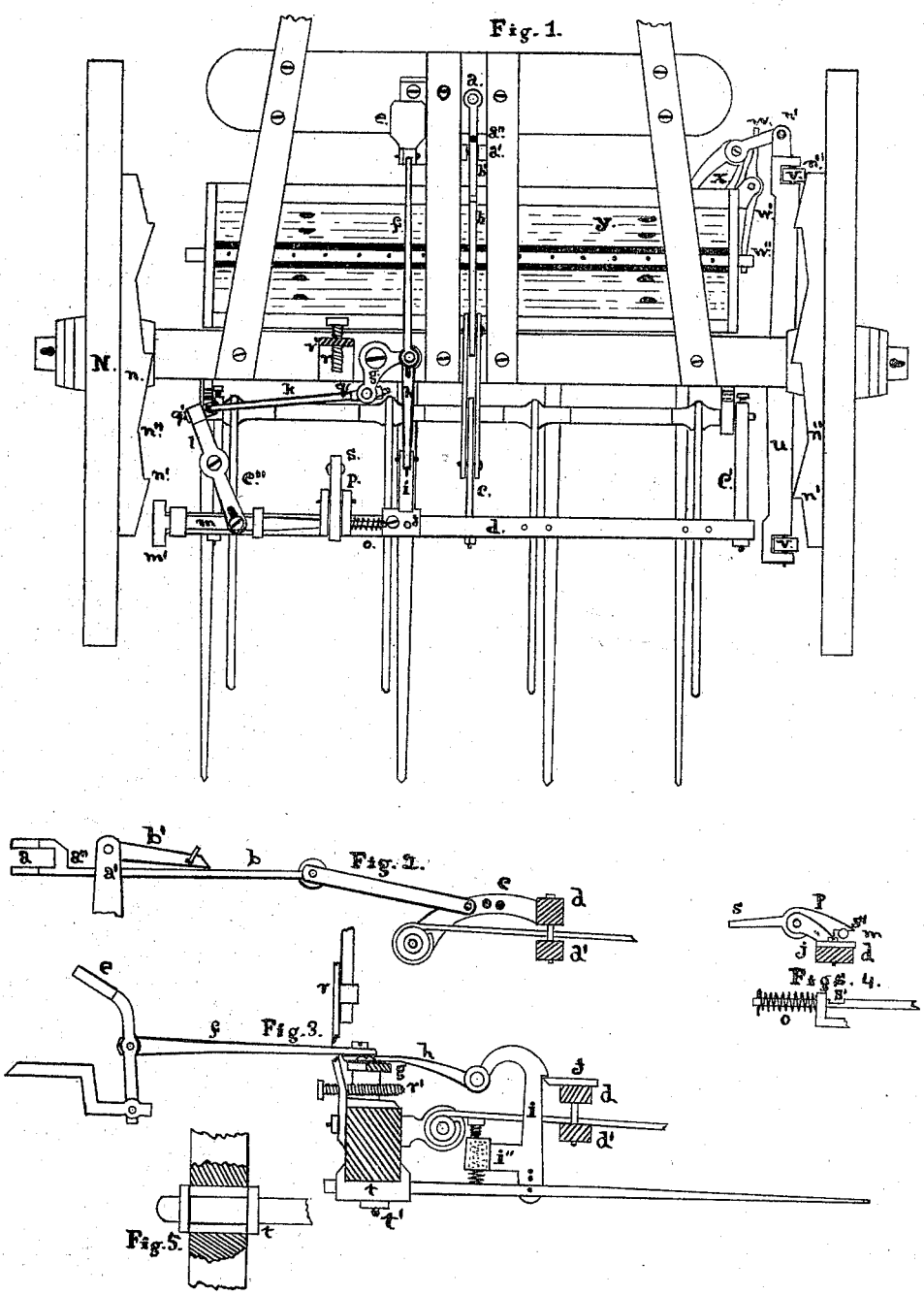

UNITED STATES PATENT OFFICE.

BEN MORSE, OF ITHACA, NEW YORK.

IMPROVEMENT IN HORSE HAY-RAKES.

Specification forming part of Letters Patent No. 141,884, dated August 19, 1873; application filed March 6, 1873.

CASE A.

*To all whom it may concern:*

Be it known that I, BEN MORSE, of Ithaca, Tompkins county, New York, have invented a Rake adapted in part to a Sower, of which the following is a specification:

My object is to make a rake easily dumped, and to combine a sower in one machine; and my invention consists in the arrangement and construction of the several parts I use in producing my devices, as will be apparent as I describe them.

Figure 1 is a view looking down on my machine. Fig. 2 is a side view of the horse-draft. Fig. 3 is a side view of my foot arrangement for releasing the rake, and, in part, of my device for moving the slide in contact with one of the wheels of the rake. Fig. 4 is a side view of my snap for locking and unlocking the rake. Fig. 5 is a view from above of my stripper fastening.

In Fig. 1, $a$ is the place where the whiffletree is connected with the draft-rod $b$, which, by a link, connects with the curved brace $c$, one end of which brace is fastened by set-screws to the rake-head shaft, and the other to the upper of two lifting and pressure bars, $d\ d'$. By holes in the brace the length and the power of the whiffletree-draft are varied. At $b'$ is a stop, pivoted to the post $a'$, through which the draft-rod $b$ slides, and the use of this stop is to hold the teeth from the ground. At $e$ is a foot-lever, connected by the rod $f$ with the angled fixture $g$, and by the rod $h$ to the stop $i$, which stop, by the plate $j$, holds down the bars $d$, and thus the teeth rake the ground. The stop has a spring beneath it to throw it into a notch in the slide $m$, Fig. 4. From the angled fixture $g$ a rod, $k$, extends to the lever $l$, which lever is pivoted to one of the braces connecting the rake head and bars $d$, and is also pivoted to the slide $m$ on the bar $d$, one end of which slide is thus thrust against the toothed wheel $n$ on the left rake-wheel; and at the right end of the slide $m$ is a retracting-spring, $o$, near which is the snap $p$, which locks and unlocks the slide $m$ by the notch $s'$. A swivel, $q$, is on the rod $k$, as that rod partially rotates. A set-screw, $r$, is in the seat-support to unlock the snap $p$.

The action of these several parts is that, when the rake is loaded, the operator, by a slight and quick touch of his foot on the lever $e$, releases the stop $i$ from the plate $j$, and, at the same instant this touch of the lever $e$ releases the stop, the end of the slide $m$ is thrust against the wheel $n$, and as it does this the snap $p$ falls into the notch $s'$ in the slide, and thus holds the slide in a tooth of the wheel $n$. The teeth rise with the bars $d$ until the ends $s$ of the snap strikes the set-screw $r$, when the slide is released and retracted by its spring, and the teeth fall and immediately commence raking the next load, and so on, the draft of the whiffletree, in the meantime, aiding by the rod $b$ and brace $c$. The stop $a'$ is used only when the rake is not raking. All the braces $c\ c'\ c''$ between the rake-head rod and bars $d$ are fast to the rake-head rod.

Figs. 3 and 5 show my cast-iron brace or fastening for my strippers. It has two flanges on the axle, seen in Fig. 3, and two flanges on the sides of the stripper, seen in Figs. 3 and 5, and its form and the locking by the bolt and nut are sufficiently plain.

By these brief and explicit descriptions it is believed that the advantages and uses of the invention described are apparent to those skilled in the art to which it appertains.

I claim—

1. The whiffletree-bar $b$ with its adjustment at $c$, in combination with stop $b'$, as and for the purpose described.

2. The combination of foot-lever $e$, connected with the angled part of piece $g$, and the stop $i$ holding the bars $d$ and teeth to the ground.

3. The stop $i$ with its spring-arm $i''$, in combination with the plate $j$, as and for the purpose set forth.

4. The angled part or lever $g$ fast to the axle of the rake-frame, and with three connections, one to the foot-lever, another to the stop, and the other to the slide $m$.

5. The slide $m$ with head $m'$, its spring $o$, and snap-lock $p$, in combination with the catch-wheel $n$ and lever $l$, rod $k$, angled lever $g$, rod $f$, and foot-piece $e$, as set forth.

6. The snap-lock $p$ and stop for the notch $s'$ in the slide $m$ and trip-screw bolt $r$, in combination with the levers $l$ and $g$, rods $k$ and $f$, and foot-piece $e$, as set forth.

7. The lever $l$ arranged on the left-hand brace of the rake-head, with a slot in one end and a swivel in the other.

8. The set-screw arranged in the seat-rod $r$ for tilting the snap $p$.

BEN MORSE.

Witnesses:
S. J. PARKER,
A. M. LUCAS.